(12) United States Patent
Redford (10) Patent No.: US 9,052,500 B2
(45) Date of Patent: Jun. 9, 2015

(54) FAST PINHOLE CHANGER FOR CONFOCAL MICROSCOPY OR SPATIAL FILTER

(71) Applicant: INTELLIGENT IMAGING INNOVATIONS, INC., Denver, CO (US)

(72) Inventor: Glen Ivan Redford, Arvada, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 249 days.

(21) Appl. No.: 13/664,642

(22) Filed: Oct. 31, 2012

(65) Prior Publication Data

US 2013/0107359 A1    May 2, 2013

Related U.S. Application Data

(60) Provisional application No. 61/554,312, filed on Nov. 1, 2011.

(51) Int. Cl.
*G02B 21/06*    (2006.01)
*G02B 21/00*    (2006.01)
*G02B 7/00*    (2006.01)

(52) U.S. Cl.
CPC ............ *G02B 21/0032* (2013.01); *G02B 7/005* (2013.01)

(58) Field of Classification Search
CPC ............ G02B 21/0032; G02B 21/004; G02B 21/0044

USPC .................. 359/385, 389, 391–393
See application file for complete search history.

(56) References Cited

U.S. PATENT DOCUMENTS

| | | | |
|---|---|---|---|
| 7,312,920 B2 * | 12/2007 | Okugawa | 359/368 |
| 7,400,446 B2 * | 7/2008 | Mikuriya et al. | 359/385 |
| 8,188,412 B2 * | 5/2012 | Kitahara et al. | 250/201.3 |
| 8,699,132 B2 * | 4/2014 | Iketaki | 359/385 |
| 2004/0174593 A1 * | 9/2004 | Weyh et al. | 359/388 |
| 2006/0066944 A1 * | 3/2006 | Okugawa | 359/368 |
| 2006/0209399 A1 * | 9/2006 | Mikuriya et al. | 359/388 |
| 2006/0232790 A1 * | 10/2006 | Chase et al. | 356/614 |
| 2007/0081222 A1 * | 4/2007 | Bartzke et al. | 359/233 |
| 2011/0002024 A1 * | 1/2011 | Sheblee et al. | 359/201.2 |
| 2011/0090553 A1 * | 4/2011 | Kei | 359/235 |
| 2011/0278475 A1 * | 11/2011 | Lundquist et al. | 250/459.1 |

FOREIGN PATENT DOCUMENTS

JP    2005189290 A *    7/2005    ............. G02B 21/00

* cited by examiner

*Primary Examiner* — Frank Font
(74) *Attorney, Agent, or Firm* — Jason H. Vick; Sheridan Ross, PC (57) ABSTRACT

A pinhole changing device for a confocal microscope is detailed herein. Several pinholes of different sizes are contained on a single disk. A precision XY stage is used to switch between the several pinholes. The same device could be used as a spatial filter for a multi-photon microscope. One can also add beam expansion control and spherical aberration correction to the same device with no additional loss.

33 Claims, 6 Drawing Sheets

FAST PINHOLE CHANGER FOR CONFOCAL MICROSCOPY OR SPATIAL FILTER

RELATED APPLICATION DATA

This application claims the benefit of and priority under 35 U.S.C. §119(e) to U.S. Patent Application No. 61/554,312, filed Nov. 1, 2011, entitled "Fast Pinhole Changer for Confocal Microscopy or Spatial Filter," which is incorporated herein by reference in its entirety.

BACKGROUND

An essential element of most confocal systems is the pinhole. In particular a scanning confocal microscope has a single pinhole that is used to exclude out-of-focus light from the image. The size of the required pinhole is a function of the objective used on the microscope as well as the particular needs of the sample. For example, a user may use a larger pinhole to sacrifice optical sectioning for greater signal. There is then a need for means for changing the size of the pinhole for a confocal microscope.

The size of the pinhole needed is often determined in relation to the diffraction limited spot created by the signal. The diffraction limited spot forms an Airy disk in a plane at the focal point. The equation $d = 1.22 \lambda / \sin \theta$ represents the approximate diameter (d) of the pinhole to give an ideal confocal signal for a given wavelength of light ($\lambda$) for an optical signal that focuses the light with angle ($\theta$). This is the diameter where the whole first Airy disk can pass through the pinhole but none of the higher order rings. Increasing the diameter would increase the signal, but would allow more out-of-focus light.

The pinhole needed for most microscope setups has a diameter on the order of microns. The alignment of the pinhole to focal point of the signal is then critical and must have sub-micron repeatability and resolution. Recently there has been the introduction of compact mechanical manipulators that have nanometer resolution. A piezo stage is an example of such a system.

Consider two pinholes next to each other. Let the signal of interest be focused through one of the pinholes. The maximum signal that could "leak" into the neighboring pinhole can be approximated using the principle that equal intensities of light are found at all radii from the central spot. That is, a ring of 1 micron thickness at 10 microns away from the center would have approximately the same intensity of light as the central 1 micron spot. The area of such a ring would be $A = 2\pi r d$, with the area of one pinhole $P = \pi d^2$, making the ratio of the intensity out of the neighboring pinhole to the intensity out of the first pinhole $d/2r$. For our example the intensity ratio would be 5%. Now if we move the second pinhole away by 1 mm, then the ratio changes to 0.05%. In reality, the ratio would be much lower, because this approximation assumes an evenly illuminated volume, when in the real case, there will be lower contributions from out-of-focus areas. Regardless, one can imagine spacing several pinholes of various sizes within a few millimeters without much of a loss of confocality. One could then use the piezo stage to select between the pinholes. Even more ideally, one could make a two dimensional pattern of pinholes and use an XY stage to select the pinhole.

Exemplary embodiments as discussed herein could also be used to switch pinholes for a spatial filter system. A spatial filter makes use of a pinhole to clean up a laser beam. By rejecting the light that is outside of the first Airy disk, the resultant beam has a better Gaussian profile. Different pinholes sizes would allow one to balance intensity vs. beam quality.

The lenses used to re-collimate the light could be motorized or moved in a fashion such that the same device could be used to provide different amounts of beam expansion or contraction with no additional loss. Also, by slightly de-collimating the light, one would change the focal plane of the light's focus at the sample. This would cause spherical aberration to be introduced by the objective. This spherical aberration could be selected such that it corrects for the spherical aberration in the sample. Thus by causing the excitation light to converge or diverge, one could add spherical aberration correction to the device with no additional loss of light.

SUMMARY

Exemplary embodiments generally relate to confocal microscopes. More specifically, an exemplary embodiment relates to a device that is adapted to change the pinhole in a confocal microscope. Exemplary embodiments also relate to spatial filtering. More specifically, an exemplary embodiment relates to spatial filtering for a multi-photon microscope.

A common setup for using a pinhole to reject out-of-focus light in a confocal microscope involves a pinhole between two lenses. The first lens focuses the collimated signal from the sample of interest. At the focal point, the light passes through the pinhole. The second lens recollimates the light or relays it to the detector. As long as the motion is in the plane normal to this optical axis, an array of pinholes could be moved into position.

In a typical confocal setup, this would happen after the scanners such that the signal is descanned. In a typical beam conditioning setup this would happen at some point in the beam path. In addition the lenses chosen could also be used as a beam expander for the laser.

Accordingly, one exemplary embodiment is directed toward an array of pinholes of different sizes mounted on a precision XY stage. The stage is then mounted between two lenses. The lens system on is designed such that the focus of each lens is at the pinhole array.

The exemplary apparatus can comprise:
an array of pinholes of different sizes arranged on a plane;
an optical system for focusing the light through the chosen pinhole;
a stage that can move the chosen pinhole into the focus location; and
a lens system for focusing the light through the pinhole and then collecting the light for measurement.

This apparatus can be combined with a pinhole switching device for a confocal microscope or for use as a spatial filter.

This device has an exemplary advantage that pinholes could be switched very rapidly in a matter of milliseconds. This device would also have an advantage of providing automated pinhole alignment with driving software.

Aspects of the invention are thus directed toward confocal microscopes.

Still further aspects of the invention are directed toward a device(s) changing the pinhole in a confocal microscope and an associated controller.

Aspects of the invention are also directed toward spatial filtering of a laser.

Still further aspects of the invention are directed toward a spatial filter system for a multi-photon microscope.

Even further aspects of the invention are directed toward an array of pinholes that can be moved in place by means of a precision XY stage.

Even further aspects of the invention are directed toward automation and control of the stage system.

Still further aspects of the invention relate to an apparatus for a modular pinhole changing device for confocal microscopes or for a spatial filter including:
- an array of different sized pinholes on a plane;
- a precision stage for moving the pinholes into position; and
- an optical system for focusing the light through the pinhole.

The aspect above, where the pinholes are arranged on a disk

The aspect above, where the inter-pinhole spacing is several orders of magnitude greater than the pinhole sizes.

The aspect above, where the stage is motorized.

The aspect above, where the stage is a piezo stage.

The aspect above, where the stage is motorized in one direction, with the motion aligned with the location of the pinholes.

The aspect above, where the stage can move in two or three dimensions.

The aspect above, where the motorization control device is synchronized with the scanner and/or detector.

The aspect above, where the apparatus is attached to an optical microscope.

The aspect above, where the apparatus is combined with a scanning microscope.

The aspect above, where the scanning microscope is a confocal microscope.

The aspect above, where the apparatus is used as a spatial filter for the input laser on a microscope.

The aspect above, where the scanning microscope is a multi-photon microscope.

The aspect above, where the apparatus is automated and controlled with a computer program.

These and other features and advantages of this invention are described and, or are apparent from, the following detailed description of the exemplary embodiment.

BRIEF DESCRIPTION OF THE DRAWINGS

The exemplary embodiments of the invention will be described in detail, with reference to the following figures wherein.

DETAILED DESCRIPTION

The exemplary embodiments of this invention will be described in relation to microscopes, imaging systems, and associated components. However, it should be appreciated that, in general, known components will not be described in detail. For purposes of explanation, numerous details are set forth in order to provide a thorough understanding of the present invention. It should be appreciated however that the present invention may be practiced in a variety of ways beyond the specific details set forth herein.

Figure 1:
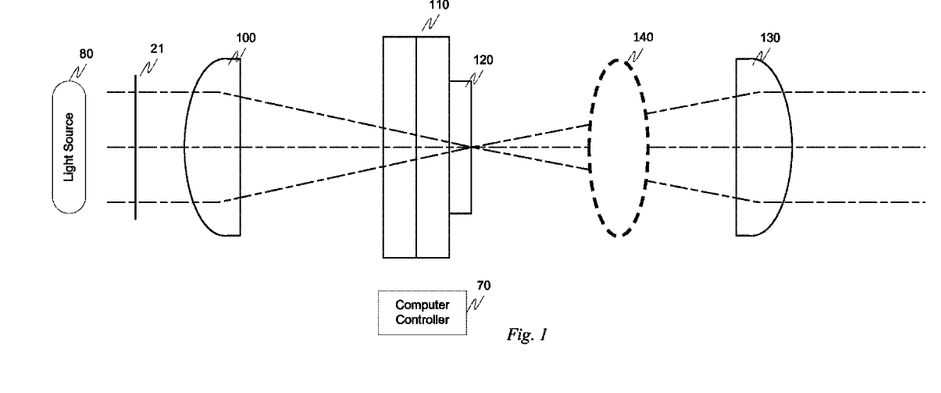
FIG. 1 illustrates an exemplary embodiment of a representation of an optical layout of a pinhole changing apparatus.
Figure 2:
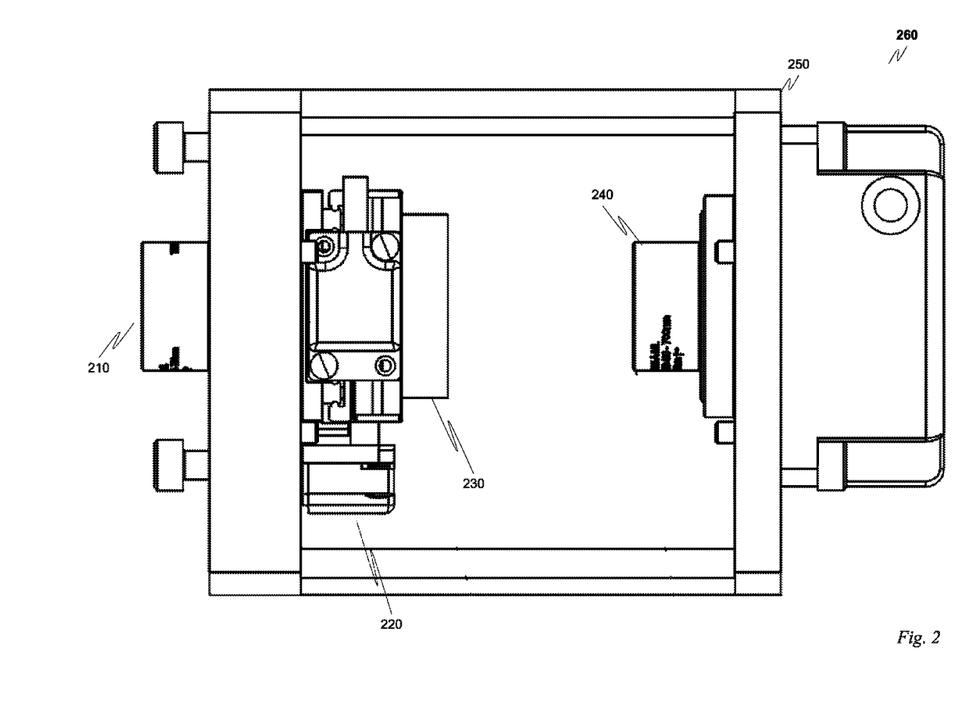
FIG. 2 illustrates an exemplary embodiment of a pinhole switching apparatus.

FIG. 1 illustrates a graphical representation of the optical layout of a pinhole changing device. The input light from light source 80 is focused through the lens 100 onto the pinhole. The pinhole is held by an XY stage 110. The pinhole is one of several found on a pinhole disk 120 which is moved by the stage (controller(s) and motor(s) have been omitted from the drawing for clarity). The light is then re-collimated by the lens 130. The optics are set such that the pinhole disk 120 and the motion of the stage 110 is perpendicular to the optical axis. The optical layout can also include an optional divergence/convergence control 140. Additionally, where the apparatus can be automated and controlled with a computer and computer program 70. FIG. 2 illustrates an exemplary embodiment of a pinhole switching device. The input light port 21 (as shown in FIG. 1) holds a collimated fiber input. The input light is focused through the lens 210 onto the pinhole. The pinhole is held by an XY (mechanical) stage 220. The pinhole is one of several found on a pinhole disk 230 which is moved by the stage. The light is then re-collimated by the lens 240. The whole device is contained within a light-tight housing 250, making it a self-contained modular device 260.

Figure 3:
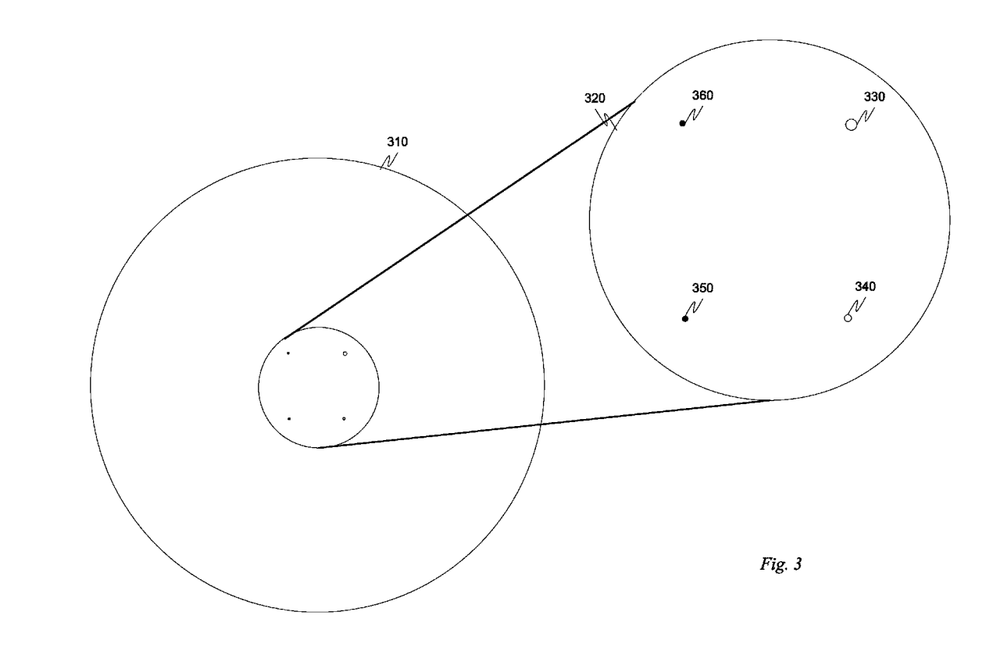
FIG. 3 illustrates an exemplary multi-pinhole disk.

FIG. 3 illustrates an exemplary embodiment of a pinhole disk. The disk 310 has several pinholes of different sizes which are seen in the center of the disk in the detail view 320. These pinholes 330-360 range in size of a few to tens of microns, but in general can be any size (depending on the application) and can be at any location and can be any number as long as the distance between them is several orders of magnitude greater.

Figure 4:
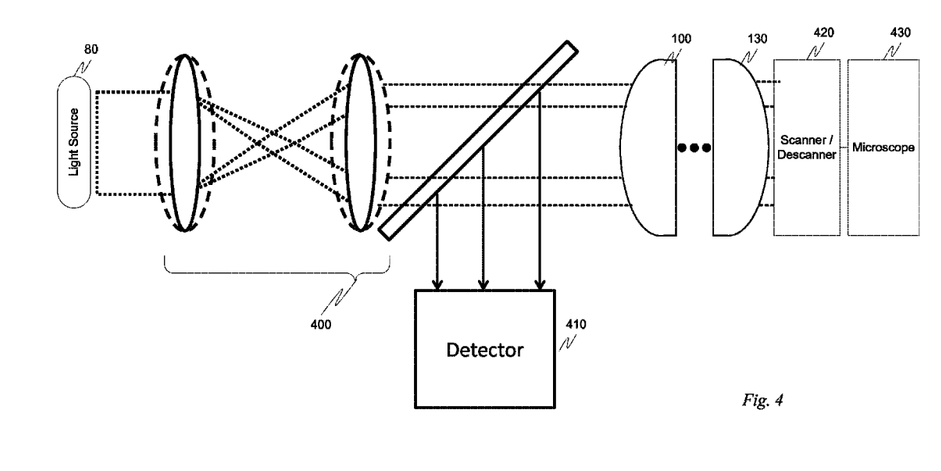
FIG. 4 illustrates additional components of the pinhole changing apparatus.

FIG. 4 illustrates a graphical representation of the optical layout of a pinhole changing device. In addition to the lens 100 and lens 130 from FIG. 1, FIG. 4 illustrates the variable beam expansion 400, detector 410, scanner/descanner 420 and microscope 430.

Figure 5:
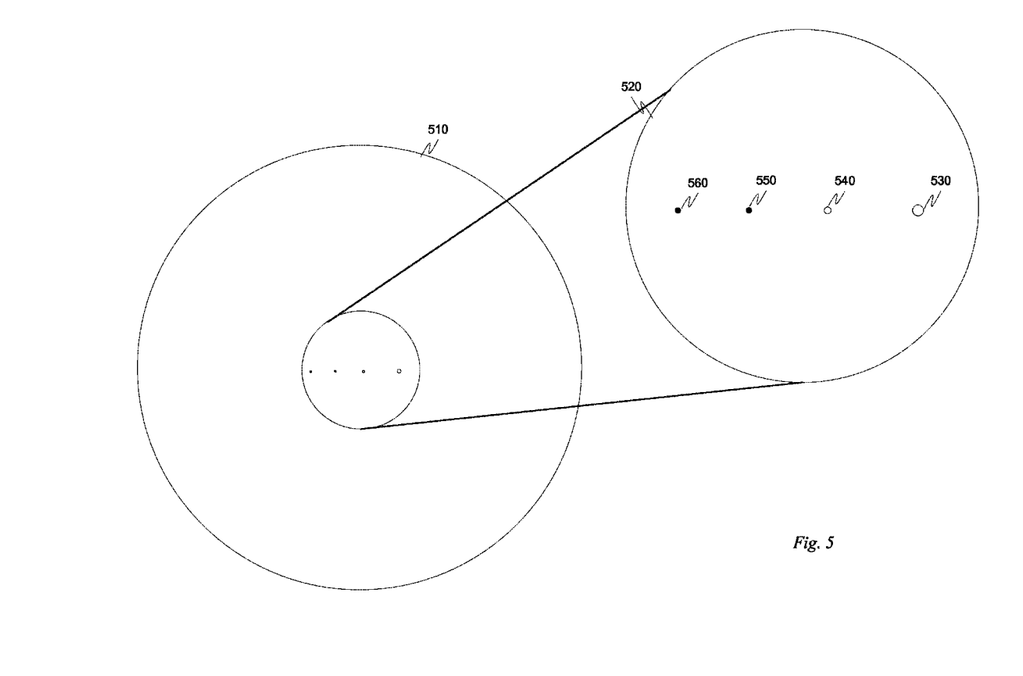
FIG. 5 illustrates an exemplary multi-pinhole disk.

FIG. 5 illustrates another exemplary embodiment of a pinhole disk. The disk 510 has several pinholes of different sizes which are seen in the disk in the detail view 520. These pinholes 530-560 range in size of a few to tens of microns, but in general can be any size (depending on the application) and can be at any location and can be any number as long as the distance between them is several orders of magnitude greater.

Figure 6:
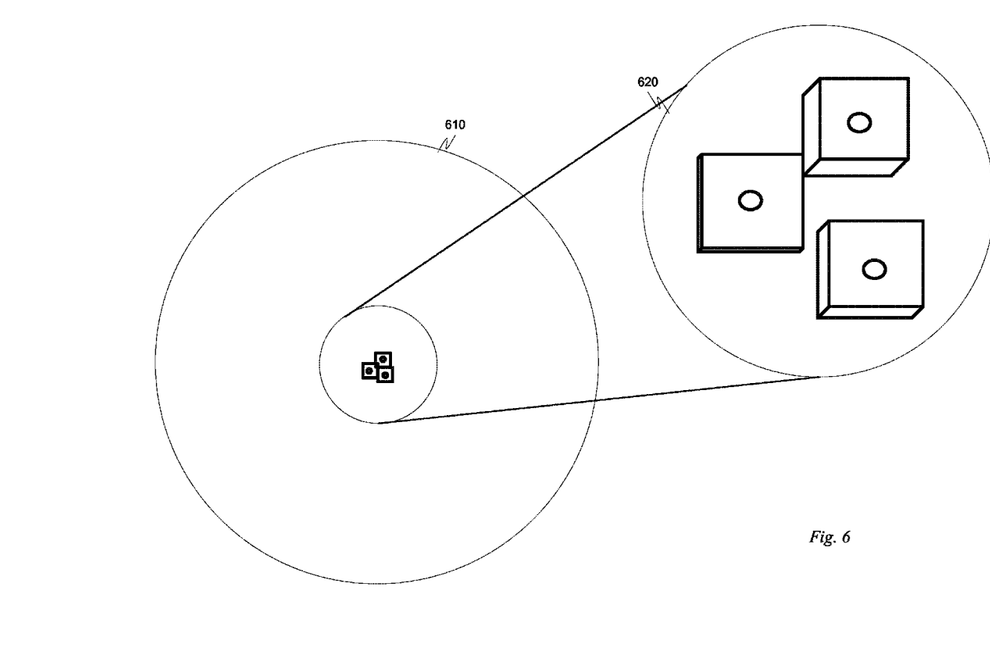
FIG. 6 illustrates an exemplary multi-pinhole disk.

FIG. 6 illustrates an exemplary embodiment of a pinhole disk. The disk 610 has several pinholes of different sizes which are seen in a 3-dimensional pattern in the detail view 620. These pinholes range in size of a few to tens of microns, but in general can be any size (depending on the application) and can be at any location and can be any number as long as the distance between them is several orders of magnitude greater.

The exemplary techniques illustrated herein are not limited to the specifically illustrated embodiments but can also be utilized with the other exemplary embodiments and each described feature is individually and separately claimable.

The systems of this invention can cooperate and interface with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, any comparable means, or the like.

Furthermore, the disclosed control methods and graphical user interfaces may be readily implemented in software using object or object-oriented software development environments that provide portable source code that can be used on a variety of computer or workstation platforms. Alternatively, the disclosed control methods may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

It is therefore apparent that there has been provided, in accordance with the present invention, a pinhole changing device. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A confocal microscope pinhole changing device comprising:
    a light-blocking part located between two lenses with at least two pinhole apertures of at least two different sizes to block out-of-focus light;
    an optical system adapted to focus light through at least one of the pinholes; and
    a device adapted to move the light-blocking part to select which of the at least one pinhole is in focus of optics.

2. The device of claim 1, where the light blocking part is a disk or shape adapted to block all light in an optical path except that light which is focused through the pinholes.

3. The device of claim 1, where the pinholes are arranged in a straight line.

4. The device of claim 1, where the pinholes are arranged in a two dimensional pattern.

5. The device of claim 1, where the pinholes are arranged in a three dimensional pattern.

6. The device of claim 1, further comprising a lens adapted to focus the light.

7. The device of claim 1, wherein the device adapted to move the light-blocking part is a mechanical stage.

8. The device of claim 7, wherein the mechanical stage is motorized.

9. The device of claim 8, wherein the mechanical stage is a piezo driven stage.

10. The device of claim 7, wherein the mechanical stage has nanometer precision.

11. The device of claim 7, wherein the mechanical stage can move in two dimensions.

12. The device of claim 7, wherein the mechanical stage can move in three dimensions.

13. The device of claim 8, where motion of the mechanical stage is synchronized with one or more external devices, and one of the one or more external devices is a scanner.

14. A pinhole changing system for a confocal microscope comprising:
    means for de-scanning a signal associated with the confocal microscope;
    a light-blocking part located between two lenses with at least two pinhole apertures of at least two different sizes to block out-of-focus light;
    an optical system adapted to focus light through a pinhole; and
    means for moving the light-blocking part to select which pinhole is in the focus of optics.

15. The system of claim 14, wherein the light blocking part is a disk or shape adapted to block all light in an optical path except that light which is focused through the pinhole.

16. The system of claim 14, wherein the pinholes are arranged in a straight line.

17. The system of claim 14, wherein the pinholes are arranged in a two dimensional pattern.

18. The system of claim 14, wherein the pinholes are arranged in a three dimensional pattern.

19. The system of claim 14, further comprising a lens adapted to focus the light.

20. The system of claim 14, wherein the means for moving is a mechanical stage.

21. The system of claim 20, wherein the mechanical stage is motorized.

22. The system of claim 21, wherein the mechanical stage is a piezo driven stage.

23. The system of claim 20 wherein the mechanical stage has nanometer precision.

24. The system of claim 20, wherein the mechanical stage can move in two dimensions.

25. The system of claim 20, where the mechanical stage can move in three dimensions.

26. The system of claim 21, wherein motion of the mechanical stage is synchronized with one or more external devices, one of the external devices being a scanner.

27. A pinhole changing system for spatial filtering comprising:
    a light source;
    a light-blocking part located between two lenses with at least two pinhole apertures of at least two different sizes to block out-of-focus light;
    an optical system for focusing the light through a pinhole; and
    means for moving the light-blocking part to select which pinhole is in the focus of optics.

28. The system of claim 27, wherein the light blocking part is a disk or shape adapted to block all light in the optical path except that light which is focused through the pinhole.

29. The system of claim 27, wherein the pinholes are arranged in a straight line.

30. The system of claim 27, wherein the pinholes are arranged in a two dimensional pattern.

31. The system of claim 27, wherein the pinholes are arranged in a three dimensional pattern.

32. The system of claim 27, further comprising one or more lens for focusing the light.

33. The system of claim 27, wherein the means for moving the pinholes is a mechanical stage and one of:
    the mechanical stage is motorized,
    the mechanical stage is a piezo driven stage,
    the mechanical stage has nanometer precision,
    the mechanical stage can move in two dimensions,
    the mechanical stage can move in three dimensions,
    the motion of the mechanical stage is synchronized with one or more external devices,
    the motion of the mechanical stage is synchronized with a scanner,
    the optical system further comprises means for re-collimating the light, and
    further comprising:
    one or more lenses for re-collimating the light, wherein a plurality of lenses can be moved mechanically to provide different amounts of beam expansion or contraction; and
    the means for moving is motorized and computer controlled;
    the lenses are also moved to provide differing amounts of divergence or convergence to an output beam,
    the divergence or convergence is used to correct for spherical aberration in an excitation path of a multi-photon microscope, and the light source is a pulsed laser used as an excitation source for the multi-photon microscope.

* * * * *